United States Patent
Krutz et al.

(10) Patent No.: US 8,743,962 B2
(45) Date of Patent: Jun. 3, 2014

(54) ENCODING AND DECODING OF VIDEO DATA

(75) Inventors: Andreas Krutz, Berlin (DE); Alexander Glantz, Berlin (DE); Thomas Sikora, Berlin (DE)

(73) Assignee: Technische Universität Berlin, Berlin (DE)

( * ) Notice: Subject to any disclaimer, the term of this patent is extended or adjusted under 35 U.S.C. 154(b) by 579 days.

(21) Appl. No.: 13/038,239

(22) Filed: Mar. 1, 2011

(65) Prior Publication Data

US 2012/0224632 A1    Sep. 6, 2012

(51) Int. Cl.
*H04N 7/12*      (2006.01)
*H04N 11/02*   (2006.01)
*H04N 11/04*   (2006.01)

(52) U.S. Cl.
USPC ............ 375/240.16; 375/240.01; 375/240.12; 375/240.26

(58) Field of Classification Search
USPC .............. 375/240.01, 240.12, 240.16, 240.26
See application file for complete search history.

(56) References Cited

U.S. PATENT DOCUMENTS

2006/0245497 A1    11/2006    Tourapis et al.
2009/0074082 A1    3/2009     Xiong et al.

OTHER PUBLICATIONS

Kamp, S., et al. "Decoder Side Motion Vector Derivation for Inter Frame Video Coding", IEEE International Conference on Image Processing ICIP '08, Oct. 2008, pp. 1120-1123.
Kamp, S., et al. "Decoder-Side Motion Vector Derivation for Hybrid Video Inter Coding", IEEE International Conference on Multimedia and Expo '10, Jul. 2010.
Kamp, S., et al. "Fast Decoder Side Motion Vector Derivation for Inter Frame Video Coding", IEEE International Picture Coding Symposium PCS '09, May 2009.
Kamp, S., et al. "Multihypothesis Prediction using Decoder Side Motion Vector Derivation in Inter Frame Video Coding", SPIE Visual Communications and Image Processing VCIP '09, Jan. 2009.
Klomp, S., et al. "Decoder—Side Block Motion Estimation for H.264/MPEG-4 AVC Based Video Coding", IEEE International Symposium on Circuits and Systems, May 2009, pp. 1641-1644.
Wiegand, T., et al. "Overview of the H.264/AVC Video Coding Standard", IEEE Transactions on Circuits and Systems for Video Technology, Jul. 2003, vol. 13, No. 7, pp. 560-576.

*Primary Examiner* — Geepy Pe
(74) *Attorney, Agent, or Firm* — Foley & Lardner LLP

(57) ABSTRACT

An embodiment of the invention relates to a method for providing a compressed video bitstream related to consecutive pictures of a video sequence, wherein the pictures are defined by pixels, said method comprising the steps of:
(a) applying at least one higher-order motion model to a motion vector field and generating at least one higher-order motion parameter set for said motion vector field, wherein said motion vector field comprises a plurality of first motion vectors, each first motion vector being assigned to a pixel block and describing the local displacement of the pixel block from the preceding picture to the consecutive picture, and wherein each pixel block comprises a plurality of pixels;
(b) calculating a second motion vector for each pixel block based on the higher-order motion parameter set;
(c) calculating the deviation between the first motion vector and the second motion vector for each pixel block; and
(d) generating a video bitstream comprising the higher-order motion parameter set, and for each pixel block an information which indicates or is based on the deviation calculated in step (c).

14 Claims, 4 Drawing Sheets

ENCODING AND DECODING OF VIDEO DATA

BACKGROUND OF THE INVENTION

Document [1] describes a hybrid video encoder which subtracts a prediction from the original signal to generate residual data. These residuals are then transformed block by block, quantized and sent to the receiver. The encoder also comprises a local decoder. The local decoder rescales the quantized transform coefficients and inversely transforms them to generate a representation of the residual data and with it a representation of the original signal. A set of previously decoded pictures stored in the picture buffer is used to generate the prediction signal.

Further prior art video coding systems are described in documents [2]-[6].

The prior art video coding systems include block-based motion estimation for motion compensated prediction at the encoder. This means that motion vectors have to be transmitted as side information. Because inter prediction is one of the major tools to achieve high compression gains, the transmission of motion vectors as side information is a significant task.

OBJECTIVE OF THE PRESENT INVENTION

An objective of the present invention is to provide a method for efficiently compressing video sequences.

A further objective of the present invention is to provide an encoder capable of efficiently compressing video sequences.

A further objective of the present invention is to provide a decoder capable of efficiently decompressing video sequences.

BRIEF SUMMARY OF THE INVENTION

An embodiment of the present invention relates to a method for providing a compressed video bitstream related to consecutive pictures of a video sequence, wherein the pictures are defined by pixels, said method comprising the steps of:
 (a) applying at least one higher-order motion model to a motion vector field and generating at least one higher-order motion parameter set for said motion vector field, wherein said motion vector field comprises a plurality of first motion vectors, each first motion vector being assigned to a pixel block and describing the local displacement of the pixel block from the preceding picture to the consecutive picture, and wherein each pixel block comprises a plurality of pixels;
 (b) calculating a second motion vector for each pixel block based on the higher-order motion parameter set;
 (c) calculating the deviation between the first motion vector and the second motion vector for each pixel block; and
 (d) generating a video bitstream comprising the higher-order motion parameter set, and for each pixel block an information which indicates or is based on the deviation calculated in step (c).

Preferably, the information includes either the assignment of the higher-order motion parameter set to the respective pixel block or the assignment of the first motion vector to the respective pixel block.

The higher-order motion parameter set may be assigned to the respective pixel block if the deviation between the first motion vector and the second motion vector is below a predefined threshold. The first motion vector may be assigned to the respective pixel block if the deviation between the first motion vector and the second motion vector exceeds the predefined threshold.

The video bitstream may be generated such that it comprises the higher-order motion parameter set, and for each pixel block the corresponding first motion vector or the assignment to the higher-order motion parameter set.

A flag may be provided for each pixel block, said flag indicating the assignment of the first motion vector or the higher-order motion parameter set to the respective pixel block. The flags may be included into the video bitstream, and the video bitstream may be transmitted to a decoder.

The method may further comprise the steps of: applying a plurality of higher-order motion models to the motion vector field and generating a plurality of higher-order motion parameter sets for the entire motion vector field, and re-calculating a plurality of second motion vectors for each pixel block and each higher-order motion parameter set.

For each pixel block it may be determined whether the deviation between the first motion vector and the corresponding second motion vector is below said predefined threshold for at least any of said higher-order motion parameter sets, and in the affirmative the respective higher-order motion parameter set may be assigned to the pixel block.

Furthermore, for each pixel block the following steps may be carried out:
 determining for each higher-order motion parameter set the corresponding second motion vector,
 determining the deviation between the first motion vector and each second motion vector;
 out of said plurality of second motion vectors, determining the best matching second motion vector, the best matching second motion vector being the second motion vector having the smallest deviation from the first motion vector; and
 assigning the higher-order motion parameter set of the best matching second motion vector to the pixel block, if the deviation between the first motion vector and the best matching second motion vector is below said predefined threshold.

Preferably, the pictures of the video sequence may be divided into at least two sections, each section comprising a plurality of pixel blocks. For each section, an individual motion vector field may be generated, and at least one higher-order motion model may be applied to each of the motion vector fields. Then, at least one higher-order motion parameter set may be generated for each motion vector field. Further, for each section, section-related data may be generated, which comprise the higher-order motion parameter set and for each pixel block the corresponding first motion vector or the assignment to the higher-order motion parameter set. The video bitstream may be generated based on the section-related data of all sections.

Further, a warping matrix may be derived as higher-order motion parameter set. The higher-order motion parameters may be compressed before including in the compressed video bitstream.

The higher-order motion parameter set is preferably calculated using a Helmholtz Tradeoff estimator.

The higher-order motion parameter set may be calculated based on a 4-, 6- or 8-parameter model.

Another embodiment of the invention relates to an encoder comprising
 a first encoder unit adapted to apply at least one higher-order motion model to a motion vector field and generating at least one higher-order motion parameter set for the said motion vector field, said motion vector field comprising a plurality of first motion vectors, each first motion vector being assigned to a pixel block and describing the local displacement of a pixel block from the preceding picture to the consecutive picture, wherein each pixel block comprises a plurality of pixels;

a second encoder unit adapted to calculate a second motion vector for each pixel block based on the higher-order motion parameter set;

a third encoder unit adapted to calculate the deviation between the first motion vector and the second motion vector for each pixel block; and a fourth encoder unit adapted to generate a video bitstream comprising the higher-order motion parameter set, and for each pixel block an information which indicates or is based on the deviation calculated by the third unit.

The information may include either a flag assigning the higher-order motion parameter set to the respective pixel block or a flag assigning the first motion vector to the respective pixel block.

The third encoder unit may be adapted to assign the higher-order motion parameter set to the respective pixel block if the deviation between the first motion vector and the second motion vector is below a predefined threshold.

The third unit may further be adapted to assign the first motion vector to the respective pixel block if the deviation between the first motion vector and the second motion vector exceeds the predefined threshold.

The fourth encoder unit may be adapted to include the first motion vectors into the video bitstream for all pixel blocks to which the first motion vector has been assigned by said third unit.

The fourth encoder unit may further re-calculate pictures based on the data contained in said video bitstream. The fourth encoder unit may calculate deviation data indicating the deviation between the re-calculated pictures and the original pictures processed by the first encoder unit. Then, the fourth encoder unit may include the deviation data as such or encoded into said video bitstream.

A further embodiment of the invention relates to a decoder capable of decoding a video bitstream generated as described above.

The decoder may be adapted to calculate a consecutive picture based on a preceding picture, a higher-order motion model, a higher-order motion parameter set, and for each pixel block an information which is included in said video bitstream and which indicates or is based on the deviation between the motion vector calculated based on the higher-order motion parameter set and the corresponding original motion vector for the respective pixel block.

A first decoder unit may identify flags in said video bitstream, each flag referring to a pixel block and either assigning a first motion vector or a higher-order motion parameter set to the respective pixel block. The first decoder unit may further identify all pixel blocks to which the higher-order motion parameter set is assigned.

A second decoder unit may calculate second motion vectors based on said higher-order motion parameter set for all pixel blocks to which the higher-order motion parameter set is assigned.

A third decoder unit may generate a video sequence based on said first and second motion vectors according to the pixel blocks' flags.

The decoder may further be adapted to identify deviation data which are included in said video bitstream and which indicate the deviation between the decoded pictures and the original pictures before encoding. Furthermore, the encoder may be adapted to correct the decoded pictures based on the deviation data.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended figures. Understanding that these figures depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENTS

The preferred embodiments of the present invention will be best understood by reference to the drawings, wherein identical or comparable parts are designated by the same reference signs throughout.

It will be readily understood that the present invention, as generally described herein, could vary in a wide range. Thus, the following more detailed description of the exemplary embodiments of the present invention, is not intended to limit the scope of the invention, as claimed, but is merely representative of presently preferred embodiments of the invention.

Figure 1:
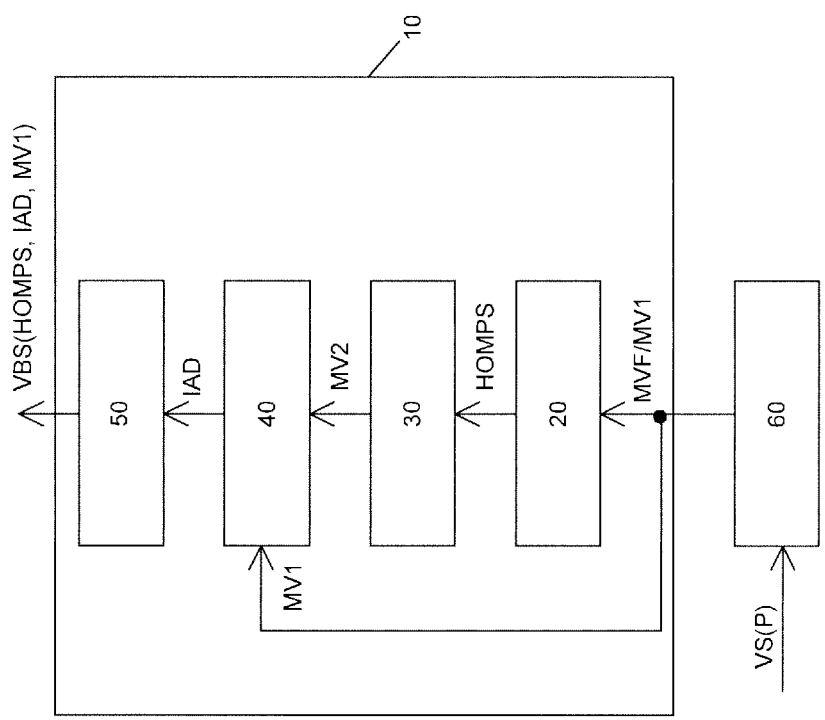
FIG. 1 shows an exemplary embodiment of an encoder.

FIG. 1 shows an exemplary embodiment of an encoder 10. The encoder comprises a first encoder unit 20, a second encoder unit 30, a third encoder unit 40 and a fourth encoder unit 50.

In the following, it is assumed that consecutive pictures P of a video sequence VS(P) are defined by pixels. In order to generate a compressed video bitstream VBS related to the consecutive pictures P of the video sequence VS(P), the encoder 10 may operate as follows:

First, a motion vector field MVF is generated which comprises a plurality of first motion vectors MV1. Each first motion vector MV1 is assigned to a pixel block and describes the local displacement of the pixel block from a preceding picture Pi to the consecutive picture Pi+1. Each pixel block consists of a plurality of pixels.

The motion vector field MVF may be generated by the first encoder unit 20, or by another entity. The embodiment shown in FIG. 1 relates to the second alternative where the motion vector field MVF is generated by an external motion vector field unit 60 which provides the motion vector field MVF for further processing by the first encoder unit 20.

The first encoder unit 20 applies a higher-order motion model to the motion vector field MVF and generates a higher-order motion parameter set HOMPS for the motion vector field MVF.

The higher-order motion parameter set HOMPS may be calculated based on estimation. For example, to this end, any algorithm can be used that can derive a higher-order motion model warping matrix from a motion vector field. The parameters of the warping matrix form the higher-order motion parameters of the higher-order motion parameter set HOMPS.

Figure 2:
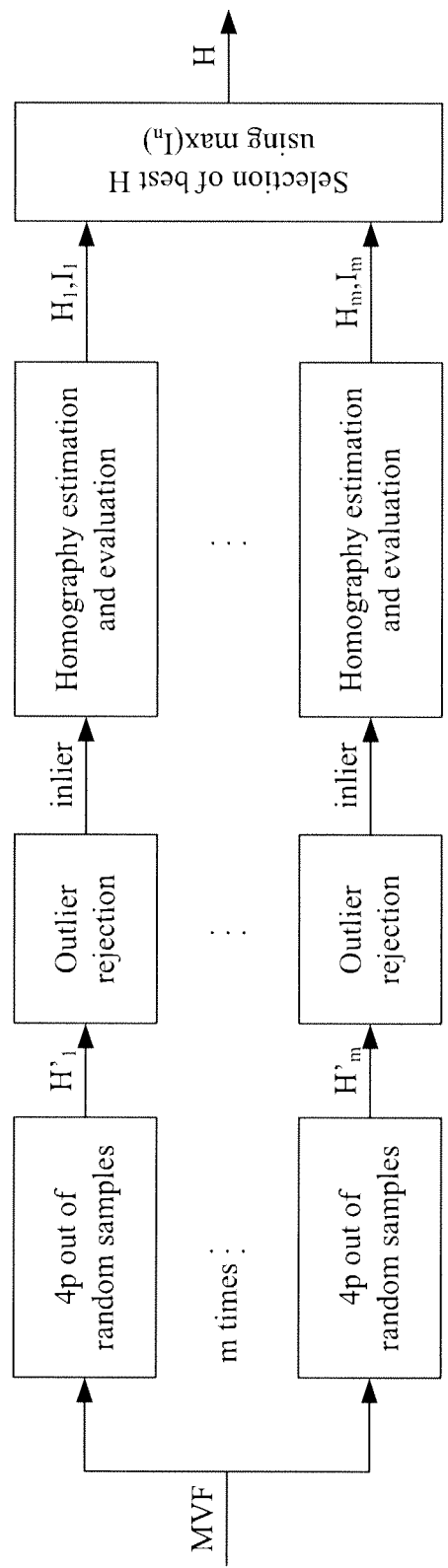
FIG. 2 shows the generation of a warping matrix in an exemplary fashion.

An example as to how a warping matrix H may be generated is shown in FIG. 2. Here, a global warping matrix H, which defines the parameters of the higher-order motion parameter set HOMPS, is calculated based on the current motion vector field MVF using a Helmholtz Tradeoff Estimator. Further details concerning the mathematical background of Helmholtz Tradeoff Estimators can be found in [2] and [3]. The warping matrix H may consist of any higher-order motion model, preferably a 4-, 6-, or 8-parameter model.

The higher-order motion parameter set HOMPS is forwarded to the second encoder unit 30. The second encoder unit 30 calculates a second motion vector MV2 for each pixel block based on the higher-order motion parameter set HOMPS (i.e. the warping matrix H). Because of the fractional pel(pixel)-accuracy of the warped motion estimation, any arbitrary pel-accuracy can be derived from the warped estimation (e.g. 1-, ½-, ¼-, ⅛-, 1/16-accuracy).

For each pixel block, the second motion vector MV2 and the corresponding first motion vector MV1 are entered into the third encoder unit 40. The third encoder unit 40 calculates a deviation between the first motion vector MV1 and the corresponding second motion vector MV2 for each pixel block.

If the deviation between the first motion vector MV1 and the second motion vector MV2 is smaller than a predefined threshold, the third encoder unit 40 assigns the higher-order motion parameter set to the respective pixel block.

If the deviation between the first motion vector MV1 and the second motion vector MV2 exceeds the predefined threshold, the third encoder unit 40 assigns the first motion vector MV1 to the respective pixel block.

In this way, an individual assignment decision IAD is made for each pixel block. The third encoder unit 40 sends the individual assignment decisions IAD to the fourth encoder unit 50 which generates the video bitstream VBS accordingly. The video bitstream VBS comprises the higher-order motion parameter set HOMPS, and for each pixel block an information which indicates the individual assignment decision IAD.

For instance, for all pixel blocks having first motion vectors MV1, which differ too much from the corresponding second motion vectors MV2, the first motion vectors MV1 may be included into video bitstream VBS. For those pixel blocks, the individual assignment decision IAD may be provided by forwarding the first motion vector MV1 with or without an additional flag.

For all pixel blocks having first motion vectors MV1, which are sufficiently similar to the corresponding second motion vectors MV2, a flag may be included into the video bitstream VBS. Said flag indicates that the motion vectors for the respective pixel blocks may be calculated based on the higher-order motion parameter set HOMPS, only. As such, for those pixel blocks, the individual assignment decision IAD is defined by the flag, only.

The first embodiment discussed above uses a fix global higher-order motion parameter set which is derived from the motion vector field MVF. Equations (1)-(3) show three higher-order motion models in an exemplary fashion. The three higher-order motion models are defined by warping matrices H:

$$H = \begin{pmatrix} m_0 & m_1 & m_2 \\ -m_1 & m_0 & m_3 \\ 0 & 0 & 1 \end{pmatrix} \quad (1)$$

for a 4-parameter motion model $$H = \begin{pmatrix} m_0 & m_1 & m_2 \\ m_3 & m_4 & m_5 \\ 0 & 0 & 1 \end{pmatrix} \quad (2)$$

for a 6-parameter motion model, and $$H = \begin{pmatrix} m_0 & m_1 & m_2 \\ m_3 & m_4 & m_5 \\ m_6 & m_7 & 1 \end{pmatrix} \quad (3)$$

for a 8-parameter motion model

Figure 3:
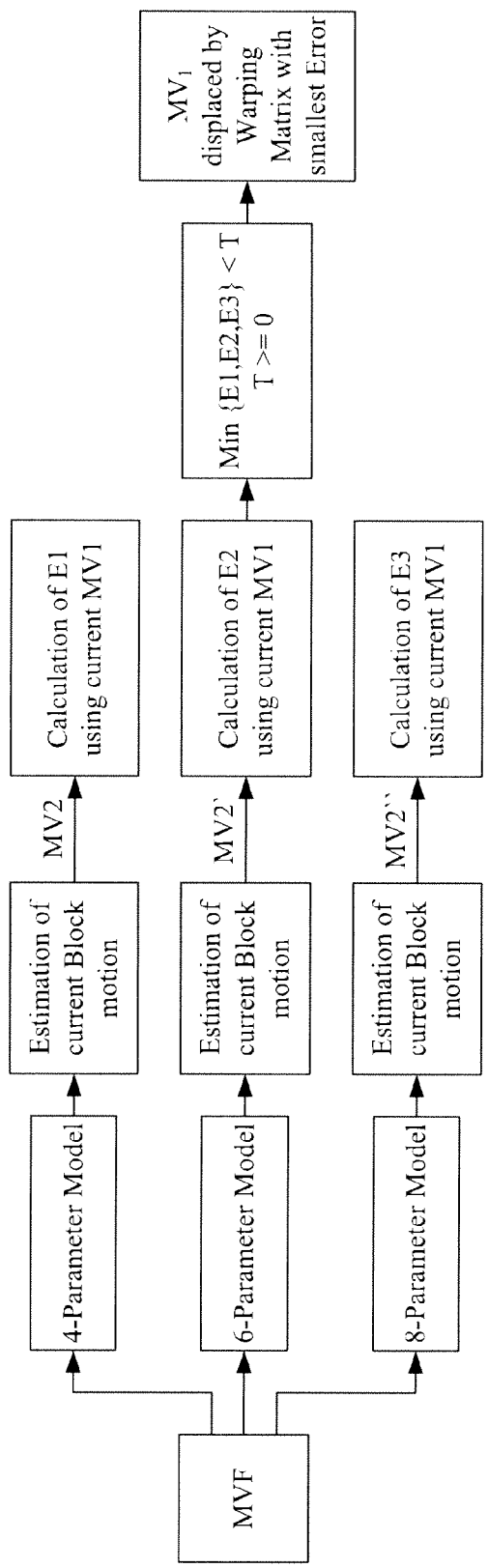
FIG. 3 shows the generation of three warping matrices in parallel in an exemplary fashion.

FIG. 3 shows a second embodiment of the present invention. In this embodiment, higher-order motion parameters for three motion models are calculated from the motion vector field MVF using the warping matrices H of equations (1)-(3).

To this end, the motion of each pixel block is estimated using all of the three warping matrices H. Based on said three warping matrices H, three second motion vectors MV2, MV2', and MV2" are determined for each pixel block. The warping matrix that produces the smallest error E1, E2 or E3 compared to the respective first motion vector MV1 is determined and is then taken for the further prediction process of the respective pixel block (instead of the respective first motion vector MV1).

An additional flag, which indicates the type of warping matrix that has finally been taken into account, may be generated and included into the compressed video bitstream VBS. The higher-order motion parameters of all higher-order motion models are preferably transmitted as side information inside the compressed video bitstream VBS. At the decoder, the additional flag and the received motion parameters allow decoding or reconstructing the encoded pictures (frames).

Furthermore, it is possible to define more than one higher-order motion parameter set for a motion vector field. For instance, the motion vector field may be arbitrarily divided into regions or partitions. Then, for each region/partition, one or more higher-order motion parameter sets are derived as explained above with respect to the entire picture and the entire corresponding motion vector field.

Then, for each pixel block of each region or partition, one or more flags may be provided which indicates which (if any) of the higher-order motion models was used for decoding the motion vectors of the respective region or partition.

Figure 4:
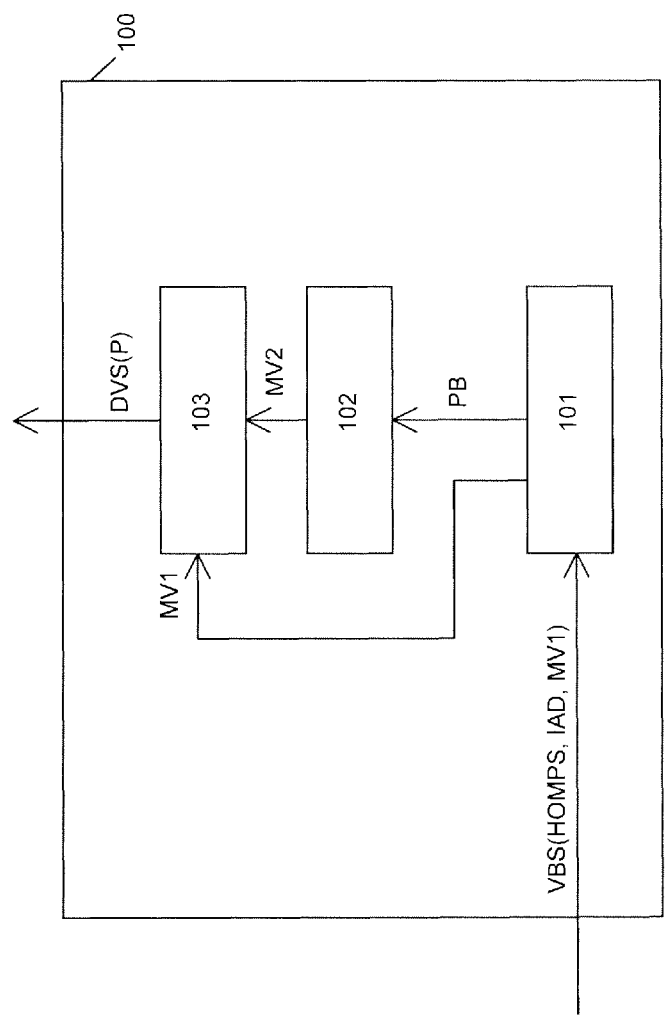
FIG. 4 shows an exemplary embodiment of a decoder.

FIG. 4 shows an exemplary embodiment of a decoder 100 for decoding the compressed video bitstream VBS which is generated by the encoder 10 shown in FIG. 1.

The decoder 100 calculates a consecutive picture Pi+1 based on a preceding picture Pi, the higher-order motion model used by the encoder 10, the higher-order motion parameter set HOMPS provided by the encoder 10 of FIG. 1, the first motion vectors MV1, and for each pixel block an information IAD, which is included in the compressed video bitstream VBS. The calculated pictures P are included in a decoded video sequence DVS(P).

To this end, the decoder 100 may comprise a first decoder unit 101 which identifies the information IAD in the compressed video bitstream VBS. The information IAD may be provided by one or more flags comprised in the compressed video bitstream VBS. Each flag refers to a pixel block and assigns to the respective pixel block either the corresponding first motion vector MV1, which is preferably transmitted in the compressed video bitstream VBS in an encoded form or unchanged, or the higher-order motion parameter set HOMPS. As such, the first decoder unit 101 identifies all pixel blocks PB to which the higher-order motion parameter set HOMPS is assigned.

The decoder 100 further comprises a second decoder unit 102 which re-calculates the second motion vector MV2 based on the higher-order motion parameter set HOMPS for all pixel blocks PB to which the higher-order motion parameter set HOMPS is assigned.

The decoder 100 further comprises a third decoder unit 103, which calculates a consecutive picture based on the preceding picture and the first and second motion vectors MV1 and MV2 according to the pixel blocks' flags. The decoded pictures P are included in the decoded video sequence DVS(P).

The decoder 100 preferably identifies deviation data which are included in the compressed video bitstream VBS and which indicate the deviation between the decoded pictures at the decoder end, and the original pictures before encoding. The encoder 100 preferably corrects the decoded pictures based on the deviation data in order to generate pictures which better match the original pictures.

LITERATURE

[1] T. Wiegand, G. J. Sullivan, G. Bjøntegaard, and A. Luthra, "Overview of the H.264/AVC, Video Coding Standard", IEEE Transactions on Circuits and Systems for Video, Technology, vol. 13, pp. 560-576, July 2003

[2] S. Kamp, M. Evertz, and M. Wien, "Decoder side motion vector derivation for inter frame video coding," in Proc. of IEEE International Conference on Image Processing ICIP '08, (San Diego, Calif., USA), pp. 1120-1123, IEEE, Piscataway, October 2008

[3] Sven Klomp, Marco Munderloh, Yuri Vatis, Jörn Ostermann "Decoder-Side Block Motion Estimation for H.264/MPEG-4 AVC Based Video Coding", in Proc. in IEEE International Symposium on Circuits and Systems, pp. 1641-1644, Taipei, Taiwan, May 2009

[4] S. Kamp, J. Ballé, and M. Wien, "Multihypothesis prediction using decoder side motion vector derivation in inter frame video coding," in Proc. of SPIE Visual Communications and Image Processing VCIP '09, (San José, Calif., USA), SPIE, Bellingham, January 2009

[5] S. Kamp, B. Bross, and M. Wien, "Fast decoder side motion vector derivation for inter frame video coding," in Proc. of International Picture Coding Symposium PCS '09, (Chicago, Ill., USA), IEEE, Piscataway, May 2009

[6] S. Kamp and M. Wien, "Decoder-side motion vector derivation for hybrid video inter coding," in Proc. of IEEE International Conference on Multimedia and Expo '10, (Singapore), IEEE, Piscataway, July 2010

| Reference Signs | |
|---|---|
| 10 | encoder |
| 20 | first encoder unit |
| 30 | second encoder unit |
| 40 | third encoder unit |
| 50 | fourth encoder unit |
| 60 | external motion vector field unit |
| 100 | decoder |
| 101 | first decoder unit |
| 102 | second decoder unit |
| 103 | third decoder unit |
| DVS(P) | decoded video sequence |
| H | warping matrix |
| HOMPS | higher-order motion parameter set |
| IAD | individual assignment decision |
| MVF | motion vector field |
| MV1 | first motion vector |
| MV2 | second motion vector |
| H | warping matrix |
| P | picture |
| VBS | compressed video bitstream |
| VS | video sequence |

The invention claimed is:

1. Method for providing a compressed video bitstream related to consecutive pictures of a video sequence, wherein the pictures are defined by pixels, said method comprising the steps of:

(a) applying at least one higher-order motion model to a motion vector field and generating at least one higher-order motion parameter set for said motion vector field, wherein said motion vector field comprises a plurality of first motion vectors, each first motion vector being assigned to a pixel block and describing the local displacement of the pixel block from the preceding picture to the consecutive picture, and wherein each pixel block comprises a plurality of pixels, and wherein the higher-order motion parameter set is calculated using a Helmholtz Tradeoff estimator;

(b) calculating a second motion vector for each pixel block based on the higher-order motion parameter set;

(c) calculating the deviation between the first motion vector and the second motion vector for each pixel block; and (d) generating a video bitstream comprising the higher-order motion parameter set, and for each pixel block an information which indicates or is based on the deviation calculated in step (c).

2. The method of claim 1
wherein said information includes either the assignment of the higher-order motion parameter set to the respective pixel block or the assignment of the first motion vector to the respective pixel block;
wherein the higher-order motion parameter set is assigned to the respective pixel block if the deviation between the first motion vector and the second motion vector is below a predefined threshold;
wherein the first motion vector is assigned to the respective pixel block if the deviation between the first motion vector and the second motion vector exceeds the predefined threshold; and
wherein said video bitstream is generated such that it comprises the higher-order motion parameter set, and for each pixel block the corresponding first motion vector or the assignment to the higher-order motion parameter set.

3. The method of claim 1 further comprising the steps of:
providing a flag for each pixel block, said flag indicating the assignment of the first motion vector or the higher-order motion parameter set to the respective pixel block, and including the flags into the video bitstream and transmitting the video bitstream to a decoder.

4. The method of claim 1 further comprising the steps of:
applying a plurality of higher-order motion models to the motion vector field and generating a plurality of higher-order motion parameter sets for the entire motion vector field; and
re-calculating a plurality of second motion vectors for each pixel block and each higher-order motion parameter set.

5. The method of claim 4 further comprising the steps of:
determining for each pixel block whether the deviation between the first motion vector and the corresponding second motion vector is below said predefined threshold for at least any of said higher-order motion parameter sets, and in the affirmative assigning the respective higher-order motion parameter set to the pixel block.

6. The method of claim 4 wherein for each pixel block the following steps are carried out:
determining for each higher-order motion parameter set the corresponding second motion vector,
determining the deviation between the first motion vector and each second motion vector;
out of said plurality of second motion vectors, determining the best matching second motion vector, the best matching second motion vector being the second motion vector having the smallest deviation from the first motion vector; and
assigning the higher-order motion parameter set of the best matching second motion vector to the pixel block, if the deviation between the first motion vector and the best matching second motion vector is below said predefined threshold.

7. The method of claim 1
wherein the pictures of said video sequence are divided into at least two sections, each section comprising a plurality of pixel blocks.

8. The method of claim 7
wherein for each section an individual motion vector field is generated;
wherein at least one higher-order motion model is applied to each of the motion vector fields;
wherein at least one higher-order motion parameter set is generated for each motion vector field;
wherein, for each section, section-related data are generated, said section-related data comprising the higher-order motion parameter set, and for each pixel block the corresponding first motion vector or the assignment to the higher-order motion parameter set; and
wherein said video bitstream is generated based on the section-related data of all sections.

9. The method of claim 1 wherein
a warping matrix is derived as higher-order motion parameter set.

10. The method of claim 9 wherein
the higher-order motion parameters are compressed before including in the compressed video bitstream.

11. The method of claim 1 wherein
the higher-order motion parameter set is calculated based on a 4-, 6- or 8-parameter model.

12. Encoder comprising
a first encoder unit adapted to apply at least one higher-order motion model to a motion vector field and generating at least one higher-order motion parameter set for the said motion vector field, said motion vector field comprising a plurality of first motion vectors, each first motion vector being assigned to a pixel block and describing the local displacement of a pixel block from the preceding picture to the consecutive picture, wherein each pixel block comprises a plurality of pixels, and wherein the higher-order motion parameter set is calculated using a Helmholtz Tradeoff estimator;
a second encoder unit adapted to calculate a second motion vector for each pixel block based on the higher-order motion parameter set;
a third encoder unit adapted to calculate the deviation between the first motion vector and the second motion vector for each pixel block; and
a fourth encoder unit adapted to generate a video bitstream comprising the higher-order motion parameter set, and for each pixel block an information which indicates or is based on the deviation calculated by the third unit.

13. Encoder according to claim 12
wherein said information includes either a flag assigning the higher-order motion parameter set to the respective pixel block or a flag assigning the first motion vector to the respective pixel block;
wherein said third encoder unit is adapted to assign the higher-order motion parameter set to the respective pixel block if the deviation between the first motion vector and the second motion vector is below a predefined threshold;
wherein said third unit is further adapted to assign the first motion vector to the respective pixel block if the deviation between the first motion vector and the second motion vector exceeds the predefined threshold; and
wherein said fourth encoder unit is adapted to include the first motion vectors into the video bitstream for all pixel blocks to which the first motion vector has been assigned by said third unit.

14. Encoder according to claim 13
wherein said fourth encoder unit is adapted to re-calculate pictures based on the data contained in said video bitstream,
wherein said fourth encoder unit is further adapted to calculate deviation data indicating the deviation between the re-calculated pictures and the original pictures processed by the first encoder unit, and
wherein said fourth encoder unit is further adapted to include the deviation data as such or encoded into said video bitstream.

* * * * *